UNITED STATES PATENT OFFICE.

H. W. BRADLEY, OF BINGHAMTON, NEW YORK, ASSIGNOR TO CHARLES M. DICKINSON, OF SAME PLACE.

IMPROVED PAINT COMPOUND.

Specification forming part of Letters Patent No. 90,073, dated May 18, 1869.

*To all whom it may concern:*

Be it known that I, H. W. BRADLEY, of Binghamton, in the county of Broome and State of New York, have invented a new and Improved Compound for Paint; and I do hereby declare that the following is a full and exact description thereof.

The nature of my invention consists in a new and improved composition of ingredients, including oil, water, and some of the metallic alkalies, for paint, whereby its freshness and chemical affinity may be preserved for use, and which shall be more durable and less expensive than other paints in ordinary use. It also consists in facilitating the blending of colors for shading the paint.

In the manufacture of my improved paint, I make use of all the pigments used for the composition of ordinary paint; and in the manufacture of my improved paint I use the following ingredients, in about the proportions herein stated:

For the priming or "stuffing" coat: three hundred pounds of carbonate or white lead; twenty-five gallons of linseed-oil; four gallons of spirits of turpentine or naphtha; twenty-four gallons of water, to which I add six pounds of sugar or nitrate of lead; four ounces of tannic acid; five pounds of white glue dissolved in a sufficient quantity of water to hold it in solution; then mix by grinding or agitation.

For the enamel or finishing coat: two hundred pounds oxide of zinc; one hundred pounds carbonate of lead; twenty-five gallons of bleached or prepared oils; two gallons spirits of turpentine; twenty-two gallons of water; six pounds of sugar or nitrate of lead; five pounds of white glue, mixed and treated as above described.

My improved composition may be readily shaded to any desired tint by the use of any pigment or dye used for coloring. For example, to produce a cream-yellow, I dissolve four pounds of bichromate of potash in water, with the same amount of sugar of lead, which, when added to the above-described composition, will produce a bright cream-yellow.

In the manufacture of my improved paint, I use double the quantity of oil to a given amount of pigment than ordinarily used, thereby giving a product of nearly three times the amount of paint more than by the usual process of manufacture.

My improved paint is designed to be manufactured and put up in suitable vessels for use, without other preparation, the peculiarity of the composition obviating all liability of the compound to separate or precipitate by standing. Pigments ground in oil for remixing and thinning, as manufactured by the ordinary method, very soon deteriorate, and become rancid and dried up. Paints manufactured for the same purpose by my process, with saponified oil and water, as described, remain fresh and improved in their condition for any length of time, and are readily reduced to their proper working consistency by oil or otherwise.

Having thus described my invention, what I claim, and desire to secure by Letters Patent, is—

As a new article of manufacture, a paint composed of the within-described ingredients, or their equivalents, whereby oil and water are affined or saponified in such a manner that the pigments may be held in affinity, as herein described, for the purposes set forth.

H. W. BRADLEY.

Witnesses:
  J. C. ARCHER,
  F. A. DURKEE.